United States Patent Office 3,423,334
Patented Jan. 21, 1969

3,423,334
POLYPERFLUOROAZOMETHINE
Donald L. Miller, Norman L. Madison, and Douglas A. Rausch, Midland, Mich., assignors to The Dow Chemical Company, Midland, Mich., a corporation of Delaware
No Drawing. Filed June 21, 1965, Ser. No. 465,770
U.S. Cl. 260—2       3 Claims
Int. Cl. C08g 33/02; C07c 87/20

ABSTRACT OF THE DISCLOSURE

Poly(N - [difluoromethylene] - perfluoroalkylamines) corresponding to the structural formula

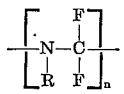

wherein R is either trifluoromethyl (—CF$_3$) or pentafluoroethyl (—C$_2$F$_5$) and $n$ is an integer of at least 4, prepared by subjecting

to high energy irradiation at a dose rate of at least about 5 megarads and at a maximum temperature of about minus 80° C.

---

This invention relates to novel polymeric fluorine containing organic polymers and more particularly is concerned with novel polyperfluoroazomethines, i.e., poly(N-[difluoromethylene] - perfluoroalkylamines) corresponding to the structural Formula I

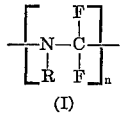
(I)

wherein R is either trifluoromethyl (—CF$_3$) or pentafluoroethyl (—C$_2$F$_5$) groups and $n$ is an integer of at least 4.

More specifically, the present invention concerns the novel composition of matter polyperfluoroazomethine, i.e., poly(N-[difluoromethylene]-trifluoromethylamine), corresponding to the Formula II

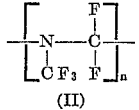
(II)

where $n$ is an integer of at least 4.

The novel polyperfluoroazomethine composition of the present invention corresponding to Formula II is a white crystalline solid melting at from about 220 to about 230° C.

Actual elemental analysis, on a weight basis, found for this product was C, 17.8 percent; N, 10.9 percent; F, 69.1 percent. Theoretical elemental analysis calculated for the product is C, 18.1 percent; N, 10.5 percent; F, 71.4 percent.

Infrared analysis showed distinctive absorption bands at 5.7, 7.75, 8.1, 8.2, 8.3, 9.0 and 10.3 microns.

Nuclear magnetic resonance spectrum of an extremely dilute solution of the polymer in a mixture of acetic acid and acetone indicated the trifluoromethyl group (—CF$_3$) and difluoromethylene group

were present in about the correct proportions consistent with the structural Formula II.

The solid polymer is substantially insoluble in a wide variety of organic materials commonly used as solvents, including for example, aliphatic hydrocarbons (i.e., pentane, ligroin, hexane, kerosene and the like) alkaryl hydrocarbons (i.e., toluene, xylene and the like). Aromatic hydrocarbons (e.g., benzene), halogen, nitro, and other substituted hydrocarbons of these types, ketones, aldehydes, ethers (i.e., diethyl ether, tetrahydrofuran and the like) and amides (e.g., dimethyl formamide). The novel product of the present invention also is substantially insoluble in aqueous acids and bases.

In general, the present composition is prepared by subjecting the corresponding perfluoroazomethine compound to high energy radiation.

Ordinarily, the reactant member perfluoroazomethine, i.e., N-(difluoromethylene-trifluoromethylamine), or N-(difluoromethylene)-pentafluoroethylamine is irradiated with gamma rays or a high energy electron beam from a Van de Graaff generator, for example, at a minimum dose rate of at least about 5 megarads while maintaining a maximum reaction temperature of about minus 80° C. Usually, a total irradiation dosage of from about 5 to about 50 megarads is employed while maintaining the reaction temperature at from about minus 130 to about minus 190° C.

The present novel polymer is suitable for use in structural and film applications wherein polymers ordinarily are employed. The composition of the present invention finds particular utility in structural and film applications requiring solvent and chemically resistant plastics, such as reagent bottles, storage vessels, inert surfaces, etc.

The following examples will serve to further illustrate the present invention but are not meant to limit it thereto.

Example 1.—Aobut 0.011 mole (1.5 grams) of perfluoroazomethine

was condensed into a 50 milliliter round-bottom irradiation cell fitted with a thin stainless steel window. The cell was placed in a liquid nitrogen bath (temperature about minus 196° C.) and irradiated for one hour with an electron beam from a Van de Graaff generator. The total irradiation dose was about 50 megarads. After the irradiation period, the cell was removed from the liquid nitrogen bath. The resulting solid product was removed from the cell after disengaging the stainless steel window.

The polymeric product was a white crystalline solid melting over a range of from about 220–230° C.

Elemental analysis showed carbon, 17.81 percent; nitrogen, 10.9 percent; fluorine, 69.1 percent.

The product was found to be substantially insoluble in benzene, acetone, dimethylformamide, tetrahydrofuran, diethyl ether, pentane, ligroin, aqueous mineral acids and aqueous inorganic bases.

Infrared analysis showed characteristic absorption bands at 5.7, 7.75, 8.1, 8.2, 8.3, 9.0 and 10.3 microns.

The substantial insolubility of the product in most solvent materials presented some difficulty in structure determination but the nuclear magnetic spectrum of a very dilute solution of the product in acetic acid and acetone showed the —CF$_3$ and —CF$_2$ groups were present in substantially the proportions consistent with the structural Formula II, for polyperfluoroazomethine.

Example 2.—Following this same general procedure as described in Example 1, a number of runs were made wherein the irradiation dose and reaction temperature was varied. The data from these runs are presented in the table which follows.

TABLE

| Run No. | PFAM[1] (grams) | Irradiation dose (megarad) | Irradiation temperature (minus ° C.) | Polyperfluoroazomethine product (form) |
|---|---|---|---|---|
| 1 | 0.80 | [2]1.1 | 190 | No product found. |
| 2 | 1.73 | 5.0 | 190 | Powder. |
| 3 | 2.00 | 10.0 | 190 | Do. |
| 4 | 2.00 | 25.0 | 190 | Do. |
| 5 | 2.00 | 50.0 | 190 | Do. |
| 6 | 1.60 | 50.0 | 125 | Wax. |
| 7 | 2.00 | 50.0 | 80 | Do. |

[1] Perfluoroazomethine.
[2] Control.

The properties and characteristics of the polymeric products obtained in these studies were substantially the same as reported for the product of Example 1.

In a manner similar to that shown and described for the foregoing examples, poly(N-[difluoromethylene]-pentafluoroethylamine) can be prepared by irradiating N-(difluoromethylene)-pentafluoroethylamine.

Various modifications can be made in the present invention without departing from the spirit or scope thereof for it is understood that we limit ourselves only as defined in the appended claims.

We claim:

1. Polyperfluoroazomethine corresponding to the structural formula

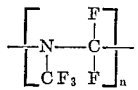

where $n$ is an integer of at least 4.

2. A process for preparing a polyperfluoroazomethine which comprises
   (a) subjecting a reactant member selected from the group consisting of N-(difluoromethylene)-trifluoromethylamine and N-(difluoromethylene)-pentafluoroethylamine to high energy irradiation at a dose rate of at least about 5 megarads at a maximum temperature of about minus 80° C. and
   (b) recovering the corresponding polyperfluoroazomethine having a structural formula

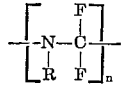

wherein R is trifluoromethyl or pentafluoroethyl and $n$ is an integer of at least 4.

3. The process as defined in claim 2 wherein the reactant member is N-(difluoromethylene)-trifluoromethylamine and said reactant member is subjected to high energy radiation of from about 5 to about 50 megarads at a reaction temperature of from about minus 130 to about minus 190° C.

References Cited

UNITED STATES PATENTS 2,966,517   12/1960   Hauptschein _____ 260—566

SAMUEL H. BLECH, Primary Examiner.

U.S. Cl. X.R.

204—159.11; 260—566, 31.2, 32.8